US012272892B2

(12) United States Patent
Chen

(10) Patent No.: US 12,272,892 B2
(45) Date of Patent: Apr. 8, 2025

(54) ELECTRICAL CONNECTOR ASSEMBLY WITH LARGER CONTACT SURFACE AREAS

(71) Applicant: Delta Electronics, Inc., Taoyuan (TW)

(72) Inventor: Heng-Chao Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 361 days.

(21) Appl. No.: 17/837,967

(22) Filed: Jun. 10, 2022

(65) Prior Publication Data

US 2023/0291138 A1 Sep. 14, 2023

(30) Foreign Application Priority Data

Mar. 9, 2022 (CN) ......................... 202210224141.6

(51) Int. Cl.

| | |
|---|---|
| ***H01R 13/04*** | (2006.01) |
| ***H01R 13/10*** | (2006.01) |
| ***H01R 13/11*** | (2006.01) |
| ***H01R 13/20*** | (2006.01) |

(Continued)

(52) U.S. Cl.

CPC ............. *H01R 13/04* (2013.01); *H01R 13/10* (2013.01); *H01R 13/11* (2013.01); *H01R 13/20* (2013.01); *H01R 13/22* (2013.01); *H01R 13/24* (2013.01); *H01R 13/652* (2013.01); *H01R 12/57* (2013.01); *H01R 13/113* (2013.01); *H01R 13/213* (2013.01); *H01R 13/245* (2013.01);

(Continued)

(58) Field of Classification Search

CPC ........ H01R 13/04; H01R 13/10; H01R 13/11; H01R 13/20; H01R 13/22; H01R 13/24; H01R 13/652; H01R 12/57; H01R 13/113; H01R 13/213; H01R 13/245; H01R 13/26; H01R 13/648; H01R 24/60; H01R 31/06; H01R 2107/00

See application file for complete search history.

(56) References Cited

U.S. PATENT DOCUMENTS

| | | | | |
|---|---|---|---|---|
| 9,537,261 | B2 * | 1/2017 | Chen .................... | H01R 13/642 |
| 10,170,845 | B2 | 1/2019 | Ju | |

(Continued)

FOREIGN PATENT DOCUMENTS

| | | |
|---|---|---|
| CN | 107039807 A | 8/2017 |
| CN | 208539159 U | 2/2019 |

(Continued)

*Primary Examiner* — Justin M Kratt

(74) *Attorney, Agent, or Firm* — KIRTON McCONKIE; Evan R. Witt

(57) ABSTRACT

An electric connector assembly includes a socket and a plug. The socket has a first casing, a base and a first pin assembly. The first pin assembly has a plurality of ground terminals and signal terminals. Each ground terminal has a specific height, and has a first coupling portion disposed on a first end. The plug has a second casing, a receiving base and a second pin assembly. The second pin assembly has a plurality of connecting terminals. Each connecting terminal has a second coupling portion disposed on a second end. When the plug is coupling with the socket, the connecting terminals of the plug respectively clamp the ground terminals and the signal terminals of the socket, and the second coupling portions of the connecting terminals are respectively engaged with the first coupling portions of the ground terminals to increase contact areas.

8 Claims, 3 Drawing Sheets

(51) Int. Cl.

| | |
|---|---|
| ***H01R 13/22*** | (2006.01) |
| ***H01R 13/24*** | (2006.01) |
| ***H01R 13/652*** | (2006.01) |
| *H01R 12/57* | (2011.01) |
| *H01R 13/213* | (2006.01) |
| *H01R 13/26* | (2006.01) |
| *H01R 13/648* | (2006.01) |
| *H01R 24/60* | (2011.01) |
| *H01R 31/06* | (2006.01) |
| *H01R 107/00* | (2006.01) |

(52) U.S. Cl.

CPC ............ *H01R 13/26* (2013.01); *H01R 13/648* (2013.01); *H01R 24/60* (2013.01); *H01R 31/06* (2013.01); *H01R 2107/00* (2013.01)

(56) References Cited

U.S. PATENT DOCUMENTS

| | | | |
|---|---|---|---|
| 11,228,137 | B2 | 1/2022 | Xu et al. |
| 11,495,926 | B2 | 11/2022 | Chang et al. |
| 2017/0133781 | A1 | 5/2017 | Duan et al. |
| 2020/0014158 | A1 | 1/2020 | Chien et al. |
| 2021/0091500 | A1 | 3/2021 | Chang et al. |
| 2021/0091523 | A1 | 3/2021 | Chang et al. |

FOREIGN PATENT DOCUMENTS

| | | | | |
|---|---|---|---|---|
| CN | 208723144 | U | | 4/2019 |
| CN | 110729583 | B | | 8/2021 |
| CN | 215221073 | U | | 12/2021 |
| CN | 111987506 | B | | 2/2022 |
| CN | 217468879 | U | | 9/2022 |
| KR | 20100070954 | A | * | 6/2010 |
| KR | 1020100070954 | A | * | 6/2010 |
| TW | 201405951 | A | | 2/2014 |
| TW | I469730 | B | | 1/2015 |
| TW | M506400 | U | | 8/2015 |
| TW | 201705631 | A | | 2/2017 |
| TW | M542261 | U | | 5/2017 |
| TW | M554235 | U | | 1/2018 |

* cited by examiner

ELECTRICAL CONNECTOR ASSEMBLY WITH LARGER CONTACT SURFACE AREAS

CROSS-REFERENCE TO RELATED APPLICATION

This application claims priority to China Patent Application No. 202210224141.6, filed on Mar. 9, 2022. The entire contents of the above-mentioned applications are incorporated herein by reference for all purposes.

FIELD OF THE INVENTION

The present disclosure relates to an electric connector assembly, and more particularly to a USB TYPE-C electric connector assembly for charging.

BACKGROUND OF THE INVENTION

Electrical connectors are widely used in electronic equipment in newly days as an interface for power and signal transmission. However, with rapid development of technology, in order to respond to different kinds, types, or brands of electronic equipment, electrical connectors of various types and specifications are flourished. For example, the most commonly used connection interface by public is the Universal Serial Bus (USB) connector assembly. Users can plug some peripheral devices with USB male plugs, such as mice, external hard disks, mobile power supplies, etc., into the electronic devices with USB female sockets, so as to achieve electrical connection between the peripheral devices and the electronic device to transmit power and signals, and the peripheral devices can play various functions respectively.

With the increase demand in transmission amounts, transmission rate, and performance requirements, the high-speed TYPE-C specification electrical connector assembly of USB is introduced. The USB TYPE-C electrical connector assembly has smaller size than the traditional USB interfaces, but can support higher power charging and power supply capability, and faster in transmission speed. In addition, it can support front and back plugging, so that users no longer need to distinguish the front and back side, and it is more suitable for using in modern electronic devices that pursue thinness and lightness.

However, in the prior art, the size of the connection interfaces of USB TYPE-C electrical connector assembly are smaller, and the coupling ends of the internal male and female connection terminals are planes butted against each other to form electrical connection, which may result in weak structural strength and is easily damaged under the repeated plugging or unplugging operations. Meanwhile, due to the limited contact area of the planes butted against each other, when they are charged, it is easy to cause an excessively high temperature rise and make it difficult to increase the charging current value, so that the charging performance is also affected.

Therefore, there is a need of providing an electric connector assembly to obviate the drawbacks encountered from the prior arts.

SUMMARY OF THE INVENTION

It is an object of the present disclosure to provide an electric connector assembly, especially a USB TYPE-C electric connector assembly for charging. The electric connector assembly includes a socket and a plug. Due to each ground terminal of the socket being a terminal structure with increased height, the structure strength is enhanced, the heat conduction area is enlarged, and the efficacy of simplifying the structure and saving cost is also achieved.

It is another object of the present disclosure to provide an electric connector assembly, especially a USB TYPE-C electric connector assembly for charging. The electric connector assembly includes a socket and a plug. Through the arc-shaped structures or wave structures of the ends between the connection terminals of the plug and the ground terminals of the socket, the contact areas with each other are increased, the temperature rise can be reduced, and it can withstand a larger charging current value. Consequently, the charging current value and the charging performance can be improved effectively.

In accordance with an aspect of the present disclosure, there is provided an electric connector assembly including a socket and a plug. The socket has a first casing, a base and a first pin assembly, wherein the first pin assembly is arranged on the base and received in the first casing. The first pin assembly has a plurality of ground terminals and a plurality of signal terminals. Each of the ground terminals has a specific height. A first coupling portion is disposed on a first end of the corresponding ground terminal. The plug has a second casing, a receiving base and a second pin assembly, wherein the second pin assembly is arranged on the receiving base and received in the second casing. The second pin assembly has a plurality of connecting terminals. Each of the connecting terminals has a second coupling portion disposed on a second end. When the plug is correspondingly coupling with the socket, the plurality of connecting terminals of the plug respectively clamp the plurality of ground terminals and the plurality of signal terminals of the socket, and the plurality of second coupling portions of the plurality of connecting terminals are respectively engaged with the plurality of first coupling portions of the plurality of ground terminals to increase contact areas.

In an embodiment, the plurality of signal terminals are arranged symmetrically in upper and lower double rows, and the specific height of each ground terminal is same as the height from the upper row to the lower row of the corresponding signal terminals.

In an embodiment, the first end of each ground terminal is a free end.

In an embodiment, the second end of each connecting terminal is a free end.

In an embodiment, each of the ground terminals has an upper surface and a lower surface, and the first coupling portions are respectively disposed on the upper surface and the lower surface, wherein each of the first coupling portions has two concave portions and a first connecting portion, and the first connecting portion is coupled and disposed between the two concave portions.

In an embodiment, the two concave portions of the first coupling portions are arc-shaped concave portions.

In an embodiment, the plurality of connecting terminals include a plurality of upper row connecting terminals and a plurality of lower row connecting terminals, which are symmetrically arranged, wherein the second coupling portion of each connecting terminal of the upper low connecting terminals and the lower row connecting terminals rows two curved portions and a second connecting portion, the second connecting portion is coupled and disposed between the two curved portions.

In an embodiment, the two curved portions of the second coupling portions are arc-shaped curved portions, and the appearances of the arc-shaped curved portions are matched with the arc-shaped concave portions of the first coupling portions.

In an embodiment, the curved portions of the second coupling portion of each connecting terminal of the upper row connecting terminals are curved downwardly, when the second coupling portion of each connecting terminal of the upper row connecting terminals, couples with the first coupling portion of the upper surface of the corresponding ground terminal, the two downwardly curved portions respectively are in corresponding contact with the two concave portions of the upper surface, and the first connecting portion is in corresponding contact with the second connecting portion to form an electrical connection.

In an embodiment, the curved portions of the second coupling portion of each connecting terminal of the lower row connecting terminals row curved upwardly, when the second coupling portion of each connecting terminal of the lower row connecting terminals couples with the first coupling portion of the lower surface of the corresponding ground terminal, the two upwardly curved portions respectively are in corresponding contact with the two concave portions of the lower surface, and the first connecting portion is in corresponding contact with the second connecting portion to form an electrical connection.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
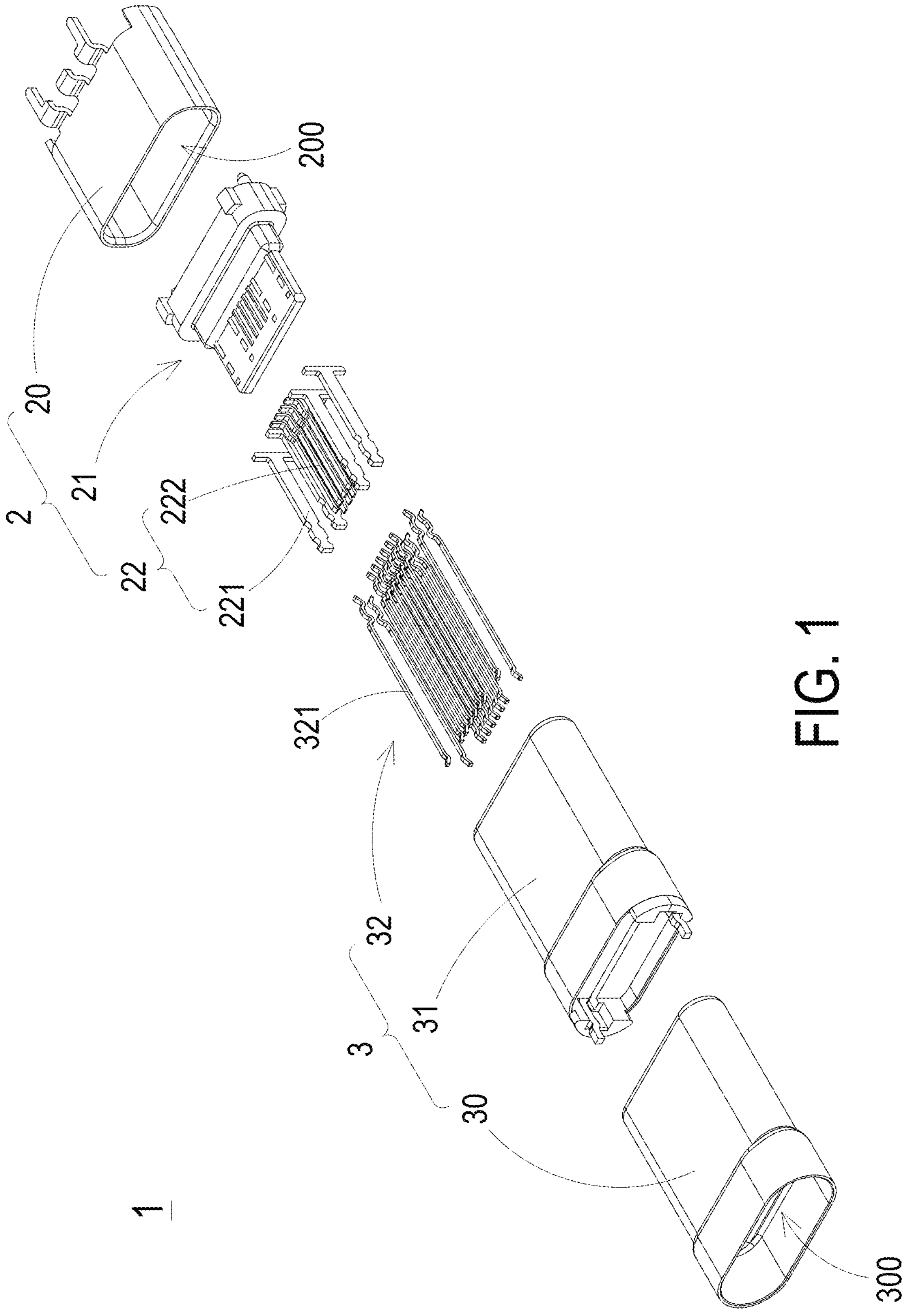
FIG. 1 is a schematic exploded view perspective view illustrating an electric connector assembly according to an embodiment of the present disclosure.
Figure 2:
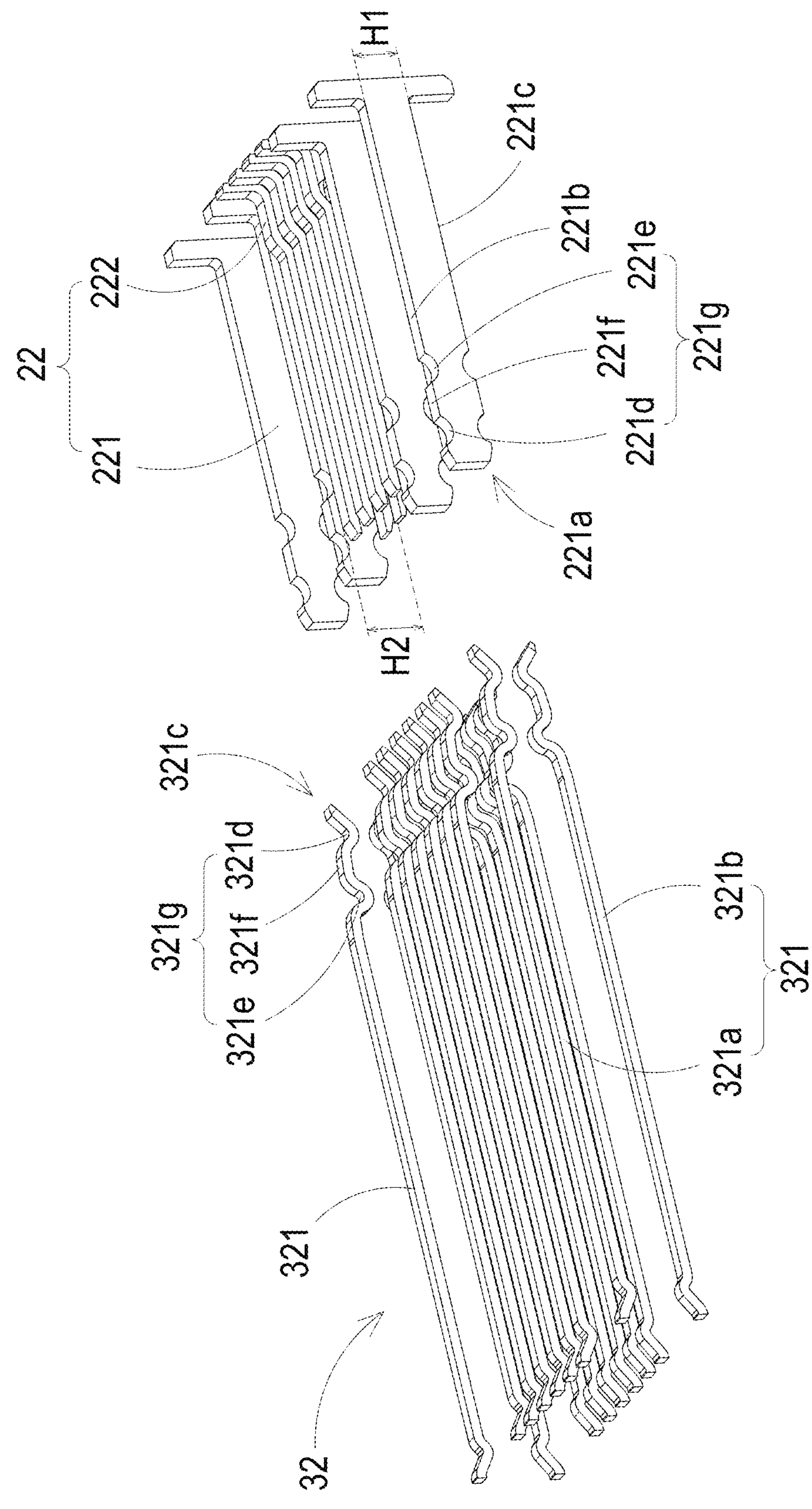
FIG. 2 is a schematic perspective view illustrating a first pin assembly and a second pin assembly of the electric connector assembly of FIG. 1.

FIG. 1 is a schematic exploded view perspective view illustrating an electric connector assembly according to an embodiment of the present disclosure. FIG. 2 is a schematic perspective view illustrating a first pin assembly and a second pin assembly of the electric connector assembly of FIG. 1. In this embodiment, the electric connector assembly 1 is a Universal Serial Bus (USB) connector assembly, especially is a USB TYPE-C electric connector assembly for charging. As shown in FIG. 1 and FIG. 2, the electric connector assembly 1 includes a socket 2 and a plug 3. The socket 2 is for correspondingly coupling with the plug 3 to form an electrical connection, so as to transmit electrical power and reach the efficacy of charging. The socket 2 includes a first casing 20, a base 21 and a first pin assembly 22, wherein the first pin assembly 22 is arranged on the base 21 and received in the first casing 20. The first pin assembly 22 includes a plurality of ground terminals 221 and a plurality of signal terminals 222. Each of the ground terminals 221 has a specific height H1, and a first coupling portion 221*g* is disposed on a first end 221*a* of the corresponding ground terminal 221. The plug 3 includes a second casing 30, a receiving base 31 and a second pin assembly 32, wherein the second pin assembly 32 is arranged on the receiving base 31 and received in the second casing 30. The second pin assembly 32 has a plurality of connecting terminals 321. Each of the connecting terminals 321 has a second coupling portion 321*g* disposed on a second end 321*c*. When the plug 3 is correspondingly coupling with the socket 2, the plurality of connecting terminals 321 of the plug 3 respectively clamp the plurality of ground terminals 221 and the plurality of signal terminals 222 of the socket 2, and the plurality of second coupling portions 321*g* of the plurality of connecting terminals 321 are respectively engaged with the plurality of first coupling portions 221*g* of the plurality of ground terminals 221 to increase contact areas.

As shown in FIG. 1, the first casing 20 of the socket 2 is a case structure with a receiving space 200, which is for receiving the base 21 and the first pin assembly 22. Similarly, the second casing 30 is also a case structure with a receiving space 300 for receiving the receiving base 31 and the second pin assembly 32. In the embodiment, the first casing 20, the base 21, the second casing 30 and the receiving base 31 are made of plastic materials, but not limited thereto. In some embodiments, the first casing 20, the base 21, the second casing 30 and the receiving base 31 may be but not limited to be manufactured by an injection molding procedure.

Please refer to FIG. 2. As shown in FIG. 2. The first pin assembly 22 includes a plurality of ground terminals 221 and a plurality of signal terminals 222. In this embodiment, the number of the plurality of ground terminals 221 is four, but not limited to. The four ground terminals 221 are grouped in two, and are correspondingly arranged out of the two sides of the plurality of signal terminals 222. The plurality of signal terminals 222 are arranged symmetrically in upper and lower double rows, and the number of the upper rows and the lower rows are also four, but not limited thereto. The four upper rows and the four lower rows of the signal terminals 222 are disposed between the two groups of the ground terminals 221. As to the second pin assembly 32, the plurality of connecting terminals 321 are also arranged symmetrically in upper and lower double rows, and the number of the connecting terminals 321 are corresponding to the number of the plurality of ground terminals 221 and the plurality of signal terminals 222. In other words, the number of the upper rows and the lower rows of the plurality of connecting terminals 321 are eight, so as to couple with the four ground terminals 221 and the four signal terminals 222, respectively. The number the plurality of connecting terminals 321, the plurality of ground terminals 221 and the plurality of signal terminals 222 are not limited to the above embodiments, which can be adjustable according the practical requirement. In other embodiments, the plurality of connecting terminals 321, the plurality of ground terminals 221 and the plurality of signal terminals 222 are made of metal materials, so as to form electrical connection when they are in contact with each other.

As shown in FIG. 2, in the first pin assembly 22, the length of each ground terminal 221 is longer than the length of each signal terminal 222. Moreover, each ground terminal 221 has a specific height H1, and the specific height H1 is defined as the height from the upper surface 221*b* to the lower surface 221*c* of the ground terminal 221. In the embodiment, the specific height H1 of each ground terminal 221 is same as the height H2 from the upper row to the lower row of the corresponding signal terminals 222. Accordingly, each ground terminal 221 of the present disclosure is a terminal structure with increased height and thickness, which can enhance the structure strength effectively due to the height is equal to the height from the upper row to the lower row of the corresponding signal terminals 222. Besides, the increased specific height H1 of the ground terminal 221 can also enlarge the heat conduction area, so that the heat can be dissipated fast, and the temperature rise can be reduced effectively.

In the embodiment, each of the ground terminals 221 has a first end 221*a*, an upper surface 221*b* and a lower surface 221*c* correspondingly disposed to the upper surface 221*b*, wherein the first end 221*a* is a free end, and another end in correspondence to the first end 221*a* is fixed on the base 21. A first coupling portion 221*g* is disposed on a first end 221*a* of each ground terminal 221. As shown in FIG. 2, each first coupling portion 221*g* of the present disclosure has two concave portions 221*d*, 221*e* and a first connecting portion 221*f*, and the first connecting portion 221*f* is coupled and disposed between the two concave portions 221*d*, 221*e*. In this embodiment, the concave portions 221*d*, 221*e* of the first coupling portion 221*g* are arc-shaped concave portions, and the surface of the first connecting portion 221*f* is flush with the upper surface 221*b* of the ground terminal 221, while the appearances of the concave portions 221*d*, 221*e* and the height of the first connecting portion 221*f* are not limited to the above embodiments, which can be adjustable according the practical requirement. In some embodiments, the two concave portions 221*d*, 221*e* and the first connecting portion 221*f* of the first coupling portion 221*g* is also symmetrically disposed on the lower surface 221*c*. In other words, in the present disclosure, the first coupling portions 221*g* are correspondingly disposed on the upper surface 221*b* and the lower surface 221*c*, but not limited thereto. In other embodiments, the first coupling portion 221*g* may be only disposed on the upper surface 221*b* of the ground terminal 221, or only disposed on the lower surface 221*c* of the ground terminal 221, but not limited to.

Please refer to FIG. 2 again. Each of the plurality of connecting terminals 321 of the second pin assembly 32 also includes a second end 321*c*. The same as the ground terminal 221, the second end 321*c* of each connecting terminal 321 is a free end, and another end in correspondence to the second end 321*c* is fixed on the receiving base 31. As previously mentioned, the plurality of connecting terminals 321 include a plurality of upper row connecting terminals 321*a* and a plurality of lower row connecting terminals row 321*b*, which are symmetrically arranged. Each connecting terminal of the upper row connecting terminals 321*a* and the plurality of lower row connecting terminals rows 321*b* has substantially same appearance, and is only arranged corresponding to each other up and down, and each of them has a second coupling portion 321*g* disposed on its second end 321*c*. The second coupling portion 321*g* is for correspondingly coupling with the first coupling portion 221*g* of the first pin assembly 22. Consequently, the appearance of the second coupling portion 321*g* is in correspondence with the first coupling portion 221*g*. For example, the second coupling portion 321*g* of each connecting terminal 321 has two curved portions 321*d*, 321*e* and a second connecting portion 321*f*, and the second connecting portion 321*f* is coupled and disposed between the two curved portions 321*d*, 321*e*. In the embodiment, the two curved portions 321*d*, 321*e* of the second coupling portion 321*g* are arc-shaped curved portions, and the appearances of the arc-shaped curved portions are matched with the arc-shaped concave portions of the first coupling portion 221*g*. As shown in FIG. 2, the curved portions 321*d*, 321*e* of the second coupling portion 321*g* of each connecting terminal 321 of the upper row connecting terminals 321*a* are curved downwardly, when each connecting terminal 321 of the upper row connecting terminals 321*a* couples with the corresponding ground terminal 221, the two downwardly curved portions 321*d*, 321*e* of the second coupling portion 321*g* are disposed in the corresponding two concave portion 221*d*, 221*e* of the upper surface 221*b* of the ground terminal 221. Similarly, the curved portions 321*d*, 321*e* of the second coupling portion 321*g* of each connecting terminal 321 of the lower row connecting terminals are curved upwardly, when each connecting terminal 321 of the lower row connecting terminals 321*b* couples with the corresponding ground terminal 221, the two upwardly curved portions 321*d*, 321*e* of the second coupling portion 321*g* are disposed in the corresponding two concave portions 221*d*, 221*e* of the lower surface 221*c* of the ground terminal 221.

Figure 3:
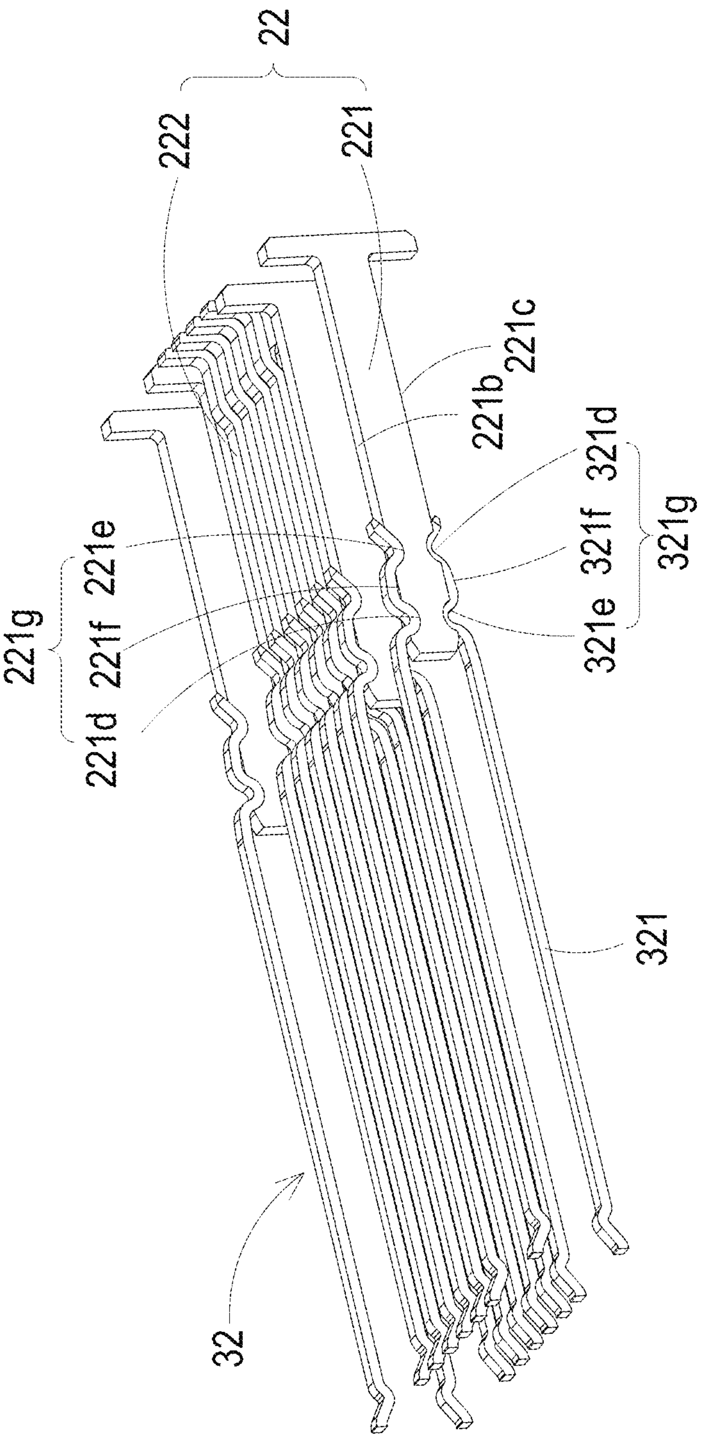
FIG. 3 is a schematic perspective view illustrating a combination of the first pin assembly and the second pin assembly of FIG. 2.

Please refer to FIG. 3. FIG. 3 is a schematic perspective view illustrating a combination of the first pin assembly and the second pin assembly of FIG. 2. As shown in FIG. 3, in the embodiment, when the plug 3 of the electric connector assembly 1 is correspondingly coupling with the socket 2, the plurality of connecting terminals 321 of the plug 3 respectively clamp the plurality of ground terminals 221 and the plurality of signal terminals 222 of the socket 2 up and down. Since the curved portions 321*d*, 321*e* of the second coupling portions 321*g* of the connection terminals 321 are both arc-shaped curved portions, when they contact the first coupling portions 221*g* of the ground terminals 221 correspondingly, they can follow the arc-shaped curve and slide forward until the curved portions 321*d*, 321*e* of the second coupling portions 321*g* are respectively disposed and positioned in the concave portions 221*d*, 221*e* of the first coupling portions 221*g*. Consequently, through the arc-shaped structures or wave structures of the curved portions 321*d*, 321*e* and the concave portions 221*d*, 221*e*, the contact areas between the connection terminals 321 and the ground terminals 221 are increased, so that it can withstand a larger charging current value.

As shown in FIG. 2 and FIG. 3. Since each of the ground terminals 221 of the present disclosure is a terminal structure with increased height, when each ground terminal 221 is clamped up and down correspondingly by the two connection terminals 321, the upper surface 221*b* is pressed against by the connection terminal 321 of the upper row connecting terminals 321*a* and the lower surface 221*c* is pressed against by the connection terminal 321 of the lower row connecting terminals rows-321*b* at the same time, so that the connecting terminals 321 of the upper row connecting terminals 321*a* and the lower row connecting terminals 321*b* are applied with abutting stress to clamp the corresponding grounding terminal 221. Moreover, as previously mentioned, when each connecting terminal 321 of the upper row connecting terminals 321*a* couples with the corresponding ground terminal 221, the two downwardly curved portions 321*d*, 321*e* of the second coupling portion 321*g* are respectively disposed in and in contact with the corresponding two concave portion 221*d*, 221*e* of the upper surface 221*b* of the ground terminal 221, and the second connecting portion 321*f* of the connecting terminals 321 of the upper row connecting terminals row 321*a* is in flat contact with the first connecting portion 221*f* of the corresponding ground terminal 221 to form electrical connection. Similarly, the two upwardly curved portions 321*d*, 321*e* of the second coupling portions 321*g* of the connecting terminals 321 of the lower row connecting terminals 321*b* are disposed in and in contact with the corresponding two concave portions 221*d*, 221*e* of the lower surface 221*c* of the ground terminal 221, and the second connecting portion 321*f* of the connecting terminals 321 of the lower row connecting terminals 321*b* is in flat contact with the first connecting portion 221*f* of the corresponding ground terminal 221 to form electrical connection. Consequently, through the corresponding arc-shaped structures or wave structures of the first coupling portions 221*g* and the second coupling portions 321*g*, the contact areas between the second ends 321*c* of the connection terminals 321 and first ends 221*a* of the ground terminals 221 are increased. Namely, the terminal contacts of this embodiment are three-dimensional multi-face contacts, which can increase the contact areas between the terminals, instead of only a single plane contact as in the prior art, which the current value flowing through it is limited.

From the above descriptions, the present disclosure provides an electric connector assembly, and the electric connector assembly is a USB TYPE-C electric connector assembly for charging, which includes a socket and a plug. Due to each ground terminal of the socket being a terminal structure with increased height, the structure strength is effectively enhanced, the heat conduction area is enlarged, and the efficacy of simplifying the structure and saving cost is also achieved. Moreover, through the arc-shaped structures or wave structures of the ends between the connection terminals of the plug and the ground terminals of the socket, the contact areas with each other are increased, the temperature rise can be reduced, and it can withstand a larger charging current value. Consequently, the charging current value and the charging performance can be improved effectively.

While the disclosure has been described in terms of what is presently considered to be the most practical and preferred embodiments, it is to be understood that the disclosure needs not be limited to the disclosed embodiment.

What is claimed is:

1. An electric connector assembly, comprising:

a socket having a first casing, a base and a first pin assembly, wherein the first pin assembly is arranged on the base and received in the first casing, and the first pin assembly has a plurality of ground terminals and a plurality of signal terminals, each of the ground terminals has a specific height, and a first coupling portion is disposed on a first end of the corresponding ground terminal; and a plug having a second casing, a receiving base and a second pin assembly, wherein the second pin assembly is arranged on the receiving base and received in the second casing, and the second pin assembly has a plurality of connecting terminals, each of the connecting terminals has a second coupling portion disposed on a second end;

wherein each of the ground terminals has an upper surface and a lower surface, and the first coupling portions are respectively disposed on the upper surface and the lower surface, wherein each of the first coupling portions has two concave portions and a first connecting portion, and the first connecting portion is coupled and disposed between the two concave portions, and the plurality of connecting terminals include a plurality of upper row connecting terminals and a plurality of lower row connecting terminals, which are symmetrically arranged, wherein the second coupling portion of each connecting terminal of the upper row connecting terminals and the lower row connecting terminals has two curved portions and a second connecting portion, the second connecting portion is coupled and disposed between the two curved portions, when the plug is correspondingly coupling with the socket, the plurality of connecting terminals of the plug respectively clamp the plurality of ground terminals and the plurality of signal terminals of the socket, wherein the second coupling portion of each connecting terminal of the upper row connecting terminals couples with the first coupling portion of the upper surface of the corresponding ground terminal, the two curved portions respectively are in corresponding contact with the two concave portions of the upper surface, and the first connecting portion is in corresponding contact with the second connecting portion to form an electrical connection, so that the plurality of second coupling portions of the plurality of connecting terminals are respectively engaged with the plurality of first coupling portions of the plurality of ground terminals to increase contact areas.

2. The electric connector assembly according to claim 1, wherein the plurality of signal terminals are arranged symmetrically in upper and lower double rows, and the specific height of each ground terminal is same as the height from the upper row to the lower row of the corresponding signal terminals.

3. The electric connector assembly according to claim 1, wherein the first end of each ground terminal is a free end.

4. The electric connector assembly according to claim 1, wherein the second end of each connecting terminal is a free end.

5. The electric connector assembly according to claim 1, wherein the two concave portions of the first coupling portions are arc-shaped concave portions.

6. The electric connector assembly according to claim 1, wherein the two curved portions of the second coupling portions are arc-shaped curved portions, and the appearances of the arc-shaped curved portions are matched with the arc-shaped concave portions of the first coupling portions.

7. The electric connector assembly according to claim 6, wherein the curved portions of the second coupling portion of each connecting terminal of the upper row connecting terminals are curved downwardly, when the second coupling portion of each connecting terminal of the upper row connecting terminals couples with the first coupling portion of the upper surface of the corresponding ground terminal, the two downwardly curved portions respectively are in corresponding contact with the two concave portions of the upper surface.

8. The electric connector assembly according to claim 7, wherein the curved portions of the second coupling portion of each connecting terminal of the lower row connecting terminals are curved upwardly, when the second coupling portion of each connecting terminal of the lower row connecting terminals couples with the first coupling portion of the lower surface of the corresponding ground terminal, the two upwardly curved portions respectively are in corresponding contact with the two concave portions of the lower surface, and the first connecting portion is in corresponding contact with the second connecting portion to form an electrical connection.

* * * * *